US010785236B2

United States Patent
Xu et al.

(10) Patent No.: US 10,785,236 B2
(45) Date of Patent: Sep. 22, 2020

(54) GENERATION OF MALWARE TRAFFIC SIGNATURES USING NATURAL LANGUAGE PROCESSING BY A NEURAL NETWORK

(71) Applicant: PALO ALTO NETWORKS, INC., Santa Clara, CA (US)

(72) Inventors: Zhaoyan Xu, Santa Clara, CA (US); Tongbo Luo, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 302 days.

(21) Appl. No.: 15/885,543

(22) Filed: Jan. 31, 2018

(65) Prior Publication Data

US 2019/0104139 A1    Apr. 4, 2019

Related U.S. Application Data

(60) Provisional application No. 62/568,180, filed on Oct. 4, 2017.

(51) Int. Cl.
*H04L 29/06* (2006.01)
*G06N 3/08* (2006.01)
*G06F 40/20* (2020.01)

(52) U.S. Cl.
CPC .......... *H04L 63/1416* (2013.01); *G06F 40/20* (2020.01); *G06N 3/08* (2013.01); *H04L 63/0245* (2013.01); *H04L 63/145* (2013.01)

(58) Field of Classification Search
CPC ............... H04L 63/1416; H04L 63/145; H04L 63/0245; G06F 40/20; G06N 3/08
See application file for complete search history.

(56) References Cited

U.S. PATENT DOCUMENTS

| 8,010,469 | B2* | 8/2011 | Kapoor | G06F 9/505 706/20 |
| 8,818,923 | B1* | 8/2014 | Hoffmann | G06N 3/082 706/18 |
| 9,332,028 | B2* | 5/2016 | Xaypanya | H04L 63/145 |
| 10,474,818 | B1* | 11/2019 | Saxe | G06F 21/561 |
| 2013/0269033 | A1* | 10/2013 | Amaya Calvo | H04L 63/0227 726/23 |
| 2017/0187736 | A1* | 6/2017 | Fehrman | H04L 63/1425 |
| 2017/0295193 | A1* | 10/2017 | Yang | H04L 41/12 |
| 2018/0075348 | A1* | 3/2018 | Zhao | G06F 21/563 |
| 2018/0189486 | A1* | 7/2018 | Yoshimura | G06F 21/552 |

* cited by examiner

*Primary Examiner* — Linglan E Edwards
(74) *Attorney, Agent, or Firm* — Gilliam IP PLLC

(57) ABSTRACT

The technology disclosed herein enables the generation of malware traffic signatures by performing natural language processing on known malware traffic using a neural network. In a particular embodiment, a method provides generating sentences comprising first information obtained from a plurality of fields in each of a plurality of known malware data packets in a first malware family. The method further provides inputting the sentences into a first neural network for natural language processing of the sentences and generating one or more signatures for the first malware family from results of the natural language processing of the sentences.

20 Claims, 7 Drawing Sheets

611
612
GET | abc/cde/fgh.html?a=b
   613

User-Agent: Mozilla/5.0 (X11; Linux x86_64; rv:12.0) Gecko/20100101 Firefox/12.0
Authorization: Basic QWxhZGRpbjpvcGVuIHNlc2FtZQ==
   614
Connection: keep alive — 617
Date: Tue, 15 Nov — 618
Host: exmaple.com — 615
Referer: http://referrer.com/example/ — 616

HTTP PACKET FIELD VALUES 600

Figure 6

Method get url abc cde fgh html. url_para a =b. user-agent mozilla/5.0 x11 linux x86_64 rv 12.0. user-agent gecko/20100101. user-agent firefox/12.0. authorization QWxhZGRpbjpvcGVuIHNlc2FtZQ==. host example.com. Referer referrer.com/ example.

DOCUMENT 700

Figure 7

GENERATION OF MALWARE TRAFFIC SIGNATURES USING NATURAL LANGUAGE PROCESSING BY A NEURAL NETWORK

RELATED APPLICATIONS

This application is related to and claims priority to U.S. Provisional Patent Application 62/568,180, titled "GENERATION OF MALWARE TRAFFIC SIGNATURES USING A NEURAL NETWORK," filed Oct. 4, 2017, and which is hereby incorporated by reference in its entirety.

TECHNICAL BACKGROUND

The amount of data being exchanged over communication networks is becoming staggeringly large. It is difficult therefore to separate packets related to malicious activity (e.g., packets exchanged by malware) from other packets because the number of malicious packets may become smaller relative to the total number of packets being exchanged. Moreover, some types of malware, such as malware implementing an advanced persistent threat (APT) attack, may spread communication across multiple independent network sessions. This spreading of communications makes it difficult to identify malicious packets from signatures generated based on traditional signature generation schemes.

SUMMARY

The technology disclosed herein enables the generation of malware traffic signatures by performing natural language processing on known malware traffic using a neural network. In a particular embodiment, a method provides generating sentences comprising first information obtained from a plurality of fields in each of a plurality of known malware data packets in a first malware family. The method further provides inputting the sentences into a first neural network for natural language processing of the sentences and generating one or more signatures for the first malware family from results of the natural language processing of the sentences.

In some embodiments, the method includes processing network traffic to identify one or more malware data packets from network traffic using the one or more signatures. In these embodiments, processing the network traffic may be performed in a network firewall, and the method may further include distributing the one or more signatures to the network firewall.

In some embodiments, the natural language processing of the sentences may include identifying one or more of syntax information, semantic information, and contextual information about network communications made by malware in the first malware family for inclusion in the results of the natural language processing of the sentences. In these embodiments, generating the signatures may include using one or more of the syntax information, semantic information, and contextual information to identify attributes shared among the network communications and create the signatures that identify the attributes.

In some embodiments, generating the sentences includes extracting the plurality fields from headers of the plurality of known malware data packets.

In some embodiments, the method includes computing a term frequency—inverse document frequency (TF-IDF) score for each field value in the plurality of fields. The first information does not include one or more field values having respective scores that do not meet at least one criterion for inclusion in the first information.

In some embodiments, generating the sentences includes splitting field values of each respective data packet of the plurality of known malware data packets into one or more words followed by a period to form the sentences for the respective data packet.

In some embodiments, the plurality of known malware data packets are represented by one or more pcap files.

In some embodiments, the first neural network comprises a word2vec model.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to generate sentences comprising first information obtained from a plurality of fields in each of a plurality of known malware data packets in a first malware family. The program instructions further direct the processing system to input the sentences into a first neural network for natural language processing of the sentences and generate one or more signatures for the first malware family from results of the natural language processing of the sentences.

In yet another embodiment, one or more computer readable storage media is provided. The one or more computer readable storage media has program instructions stored thereon for generating malware network traffic signatures that, when read and executed by a processing system, direct the processing system to generate sentences comprising first information obtained from a plurality of fields in each of a plurality of known malware data packets in a first malware family. The program instructions further direct the processing system to input the sentences into a first neural network for natural language processing of the sentences and generate one or more signatures for the first malware family from results of the natural language processing of the sentences.

BRIEF DESCRIPTION OF THE DRAWINGS

FIG. 6 illustrates packet field values used by the other implementation to create signatures to identify network traffic associated with malware.

FIG. 7 illustrates a document used by the other implementation to create signatures to identify network traffic associated with malware.

DETAILED DESCRIPTION

The technology described herein takes a deep look into the communication of malware to automatically understand the language used by the malware's communications. In particular, information within and/or about the malware's communications is formatted into a sentence structure compatible with a natural language processing model, such as a word2vec model. As such, when processing the information with a deep neural network employing the natural language processing model, the information is treated by the natural language processing model as words in the same manner it would with more typical natural language processing input (e.g., novel, news article, story, etc.) to systematically analyze the syntax, semantics, and contextual information of the malware's communication. The syntax, semantics, and contextual information is used to create a signature for identifying further malware communications. Advantageously, the method is fully automatic, including data analysis, learning, clustering, and signature generation. The method is also more accurate than manual effort. Furthermore, the method can automatically generate signatures for over 100 malware families. By evaluating millions of live traffic data, the signatures can detect malicious traffic without any false alarms.

Figure 1:
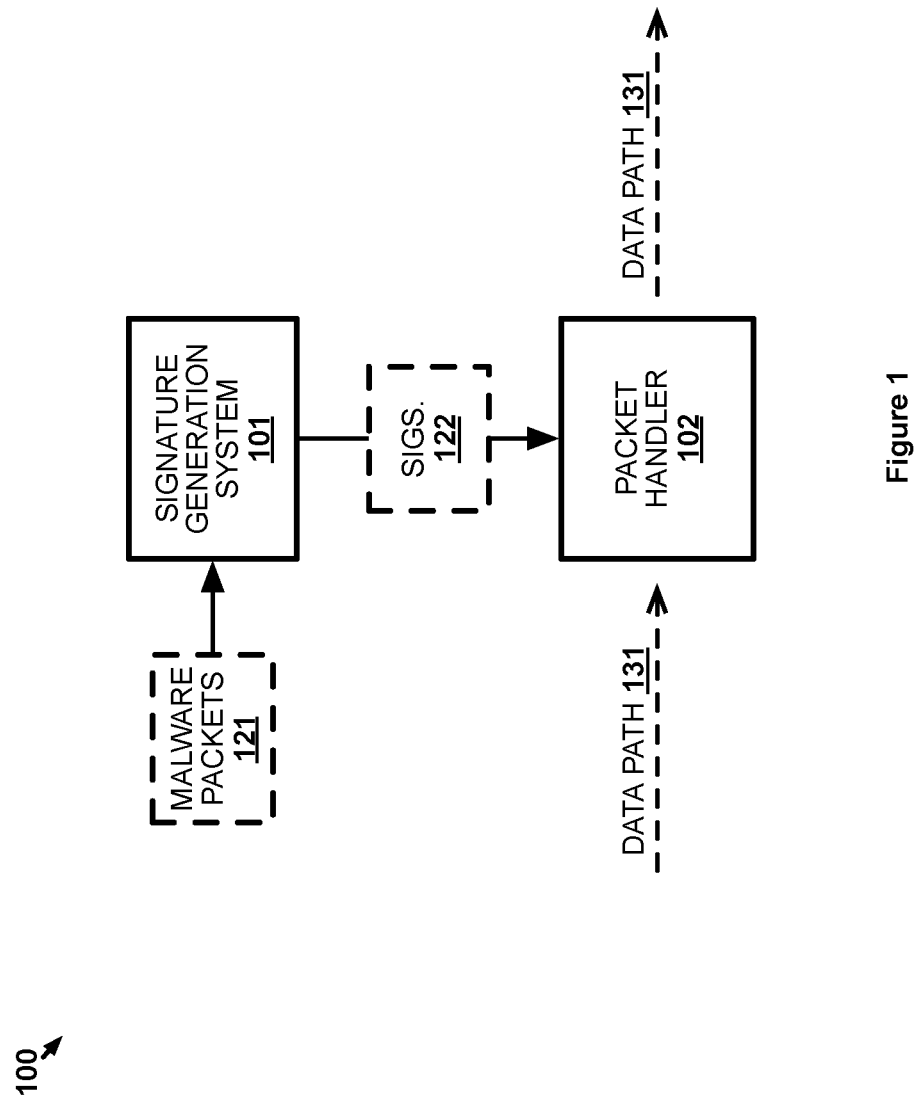
FIG. 1 illustrates an implementation for creating signatures to identify network traffic associated with malware.

FIG. 1 illustrates implementation 100 for creating signatures to identify network traffic associated with malware. Implementation 100 includes signature generation system 101 and packet handler 102. In operation, packet handler 102 operates on network packet traffic transferring on data path 131. Packet handler 102 may be a network firewall, a computing system having anti-malware software executing thereon, an intrusion detection system, or some other type of computing system that operates on network packet traffic. Packet handler 102 therefore comprises wired and/or wireless network communication circuitry for exchanging data packets over data path 131 and processing circuitry for processing data packets received via data path 131. Packet handler 102 may further include one or more storage media, such as Random-Access Memory (RAM), hard disk drives, flash memory, etc. Data path 131 may traverse one or more networked computing systems, routers, switches, access points, or other type of network element. In some cases, such as one where packet handler 102 comprises anti-malware software, data path 131 may be internal to the computing system upon which the anti-malware software executes. While only one packet handler is shown with respect to implementation 100, other implementations may include additional packet handlers, which may be positioned along different data paths but operate in a manner similar to that described for packet handler 102. For instance, a large enterprise network may include multiple network firewalls to ensure protection from malicious communications at various points in the network.

Packet handler 102 uses signatures to identify packets on data path 131 carrying malware communications. Signature generation system 101 generates the signatures that are used by packet handler 102 when processing data packets received on data path 131. Signature generation system 101 may be implemented in the same computing system as packet handler 102 or may be a separate computing system having its own network communication circuitry, processing circuitry, storage media, etc. In one example, signature generation system 101 may be implemented in a server of a data center in communication with packet handler 102, and any other packet handlers, operating in that data center. Program instructions executing 101 on signature generation system 101 may direct signature generation system 101 to perform as described herein. Communications between signature generation system 101 and packet handler 102 may be exchanged outside of data path 131, such as through a control plane of a data center.

Figure 2:
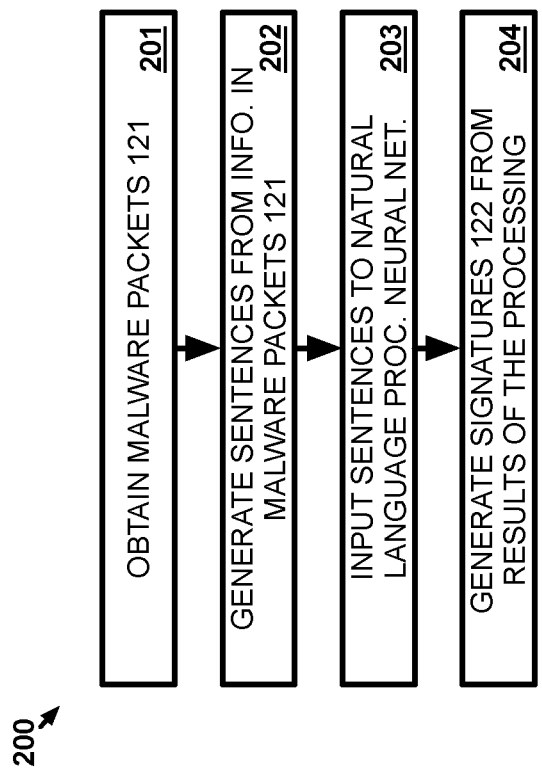
FIG. 2 illustrates a scenario for the implementation to create signatures to identify network traffic associated with malware.

FIG. 2 illustrates scenario 200 for implementation 100 to create signatures to identify network traffic associated with malware. Scenario 200 provides signature generation system 101 obtains malware packets 121 which carry communications for one or more items of malware in a malware family (201). To obtain malware packets 121, malware packets 121 may be provided to signature generation system 101 in the form of a PCAP (packet capture) file or in some other format. For example, a user/administrator of signature generation system 101 may provide malware packets 121 to signature generation system 101 after confirming that malware packets 121 contain the malware.

Scenario 200 further provides signature generation system 101 generating sentences from information obtained from fields of malware packets 121 (202). The fields may include fields for a packet source address, a packet destination address, a user agent identifier, a host identifier, a content type identifier, or any other information relevant to describing packet traffic—including combinations thereof. Each sentence for a respective packet of malware packets 121 includes a value from one of the fields. If a value includes multiple parts (e.g., key/value), then each part is separated into respective words of the sentence. Similarly, if a field includes multiple values (e.g., a user-agent field may indicate multiple user agents), then each value is a separate sentence.

Once the information has been organized into sentences, scenario 200 provides signature generation system 101 inputting the sentences into a neural network that performs natural language processing on the sentences (203). Natural language processing is able to identify, and provide as output/results, syntax, sematic, contextual information, or some other type of characteristic—including combinations thereof—about network communications made by the malware communicating via malware packets 121. The neural network may be based upon a word2vec model, although other natural language processing models may be used instead. The output of the neural network can be used to identify other packets that share the same attributes. Accordingly, scenario 200 provides signature generation system 101 generating one or more signatures 122 for the malware family from the results of the natural language processing (204). Signatures 122 may be in any format recognizable by packet handler 102 and need not be in a proprietary format for signatures generated by signature generation system 101. Once provided with signatures 122 by signature generation system 101, packet handler 102 can use signatures 122 to identify packets being transferred on data path 131 that are carrying communications for malware in the malware family.

While scenario 200 discusses the generation of signatures 122 for a single malware family, it should be understood that signature generation system 101 may generate signatures for malware in different families. For example, signature generation system 101 may be provided with malware packets carrying communications for malware of a second malware family and may generate signatures for that second malware family in the same manner as signature generation system 101 generated signatures 122. As such, packet handler 102 is able to differentiate between packets associated with different malware families based on the signatures for those respective families, which is sometimes referred to as clustering the packets into their respective families. This differentiation may allow for packets associated with different families to be handled differently rather than handling all malware packets in the same manner.

Figure 3:
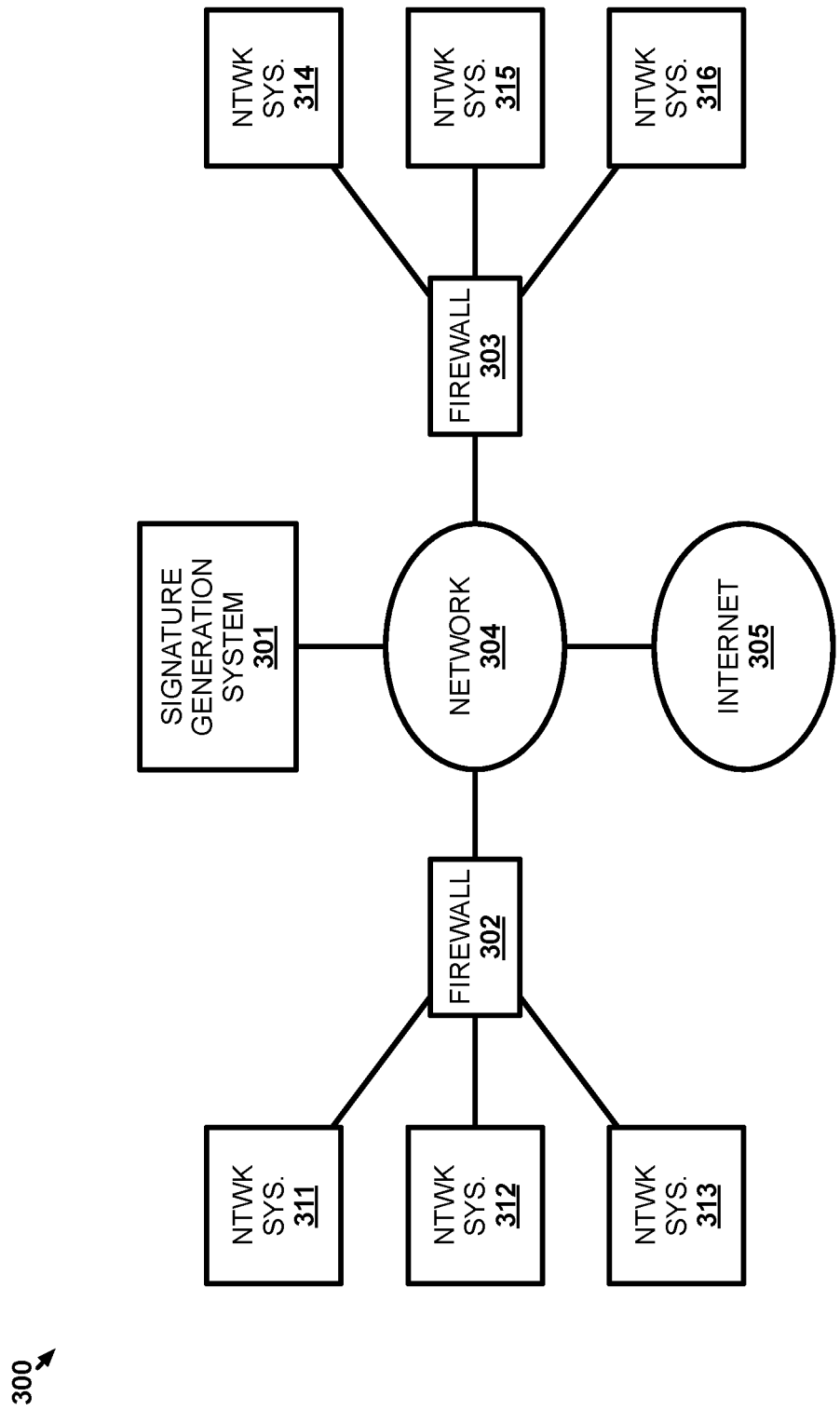
FIG. 3 illustrates another implementation for creating signatures to identify network traffic associated with malware.

FIG. 3 illustrates implementation 300 for creating signatures to identify network traffic associated with malware. Implementation 300 includes signature generation system 301, firewall 302, firewall 303, network 304, Internet 305, networked computing system 311, networked computing system 312, networked computing system 313, networked computing system 314, networked computing system 315, and networked computing system 316. Network 304 may be a physical packet network, or logical overlay network on a physical packet network, that connects networked computing system 311, networked computing system 312, networked computing system 313, networked computing system 314, networked computing system 315, networked computing system 316, and Internet 305. Signature generation system 301, networked computing system 311, networked computing system 312, networked computing system 313, networked computing system 314, networked computing system 315, and networked computing system 316 may be physical computing systems, sometimes referred to as bare metal systems, with physical hardware resources (e.g., processing circuitry, storage devices, network interface circuitry, etc.) or may be implemented as virtualized elements (e.g., virtual machines, containers, etc.) hosted by host computing systems having the physical hardware resources, firewall 302 and firewall 303, similarly, may be physical network components or may be virtualized on host computing systems.

In operation, firewall 302 and firewall 303 regulate the packet traffic exchanges with networked computing system 311, networked computing system 312, networked computing system 313, networked computing system 314, networked computing system 315, and networked computing system 316, respectively. In some examples, network 304 may be a network for a data center, which also connects the data center to Internet 305. Signature generation system 301 generates at least a portion of the signatures that are used by firewall 302 and firewall 303 to identify packets carrying malware communications that should be prevented from passing through firewall 302 and firewall 303.

Figure 4:
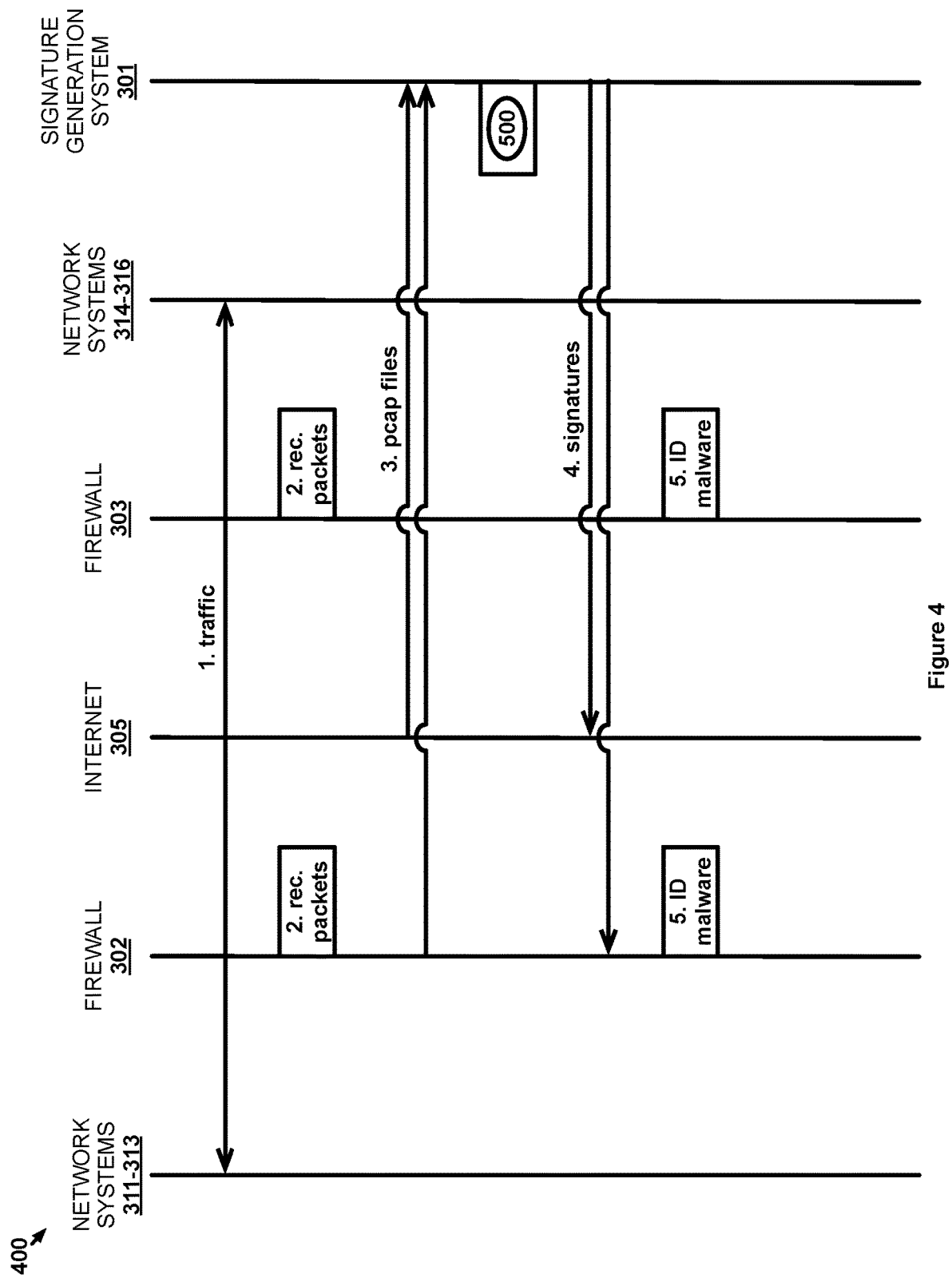
FIG. 4 illustrates a scenario for the other implementation to create signatures to identify network traffic associated with malware.

FIG. 4 illustrates scenario 400 for implementation 300 to create signatures to identify network traffic associated with malware. Network packet traffic is transferred through firewall 302 and firewall 303 at step 1 between networked computing system 311, networked computing system 312, networked computing system 313, networked computing system 314, networked computing system 315, and networked computing system 316 as well as with Internet 305. At this time, firewall 302 and firewall 303 may use signatures already generated by signature generation system 301, or provided by other sources, to determine whether packets of the network packet traffic should be allowed to pass through firewall 302 and firewall 303.

In this example, firewall 302 and firewall 303 record at least a portion of the packets at step 2 so that some of the packets can be later identified as carrying communications for malware in one or more malware families. At least a portion of the packets recorded by firewall 302 and firewall 303 are transferred at step 3 to signature generation system 301 as pcap files. In other examples, the packets may be packaged for transfer to signature generation system 301 using a mechanism other than pcap files. In this example, packets carrying malware communications are not identified until they have reached signature generation system 301 (e.g., from user input identifying malware communication carrying packets), although, in other examples, the malware communications carrying packets may be identified before the pcap files reach signature generation system 301 (thereby having the pcap files received by signature generation system 301 only include malware communications carrying packets). In the latter examples, the recorded packets may be passed from firewall 302 and firewall 303 to an intermediate system where the packets carrying malware communications may be identified before only those packets are passed to signature generation system 301. It should be understood, that scenario 400 provides only one example of how signature generation system 301 may receive pcap files for packets carrying malware communications, while signature generation system 301 may obtain the pcap files in some other manner. For instance, anti-malware software on any of networked computing system 311, networked computing system 312, networked computing system 313, networked computing system 314, networked computing system 315, and networked computing system 316 may identify the packets carrying malware communications and send those packets to signature generation system 301 so that signature generation system 301 can generate signatures that will allow those packets to be stopped by firewall 302 and firewall 303. In addition to simply identifying packets that carry malware communications to signature generation system 301, the malware family for the malware that generated each packet's communications is also identified to signature generation system 301 so that signature generation system 301 can generate signatures on a malware family basis.

Figure 5:
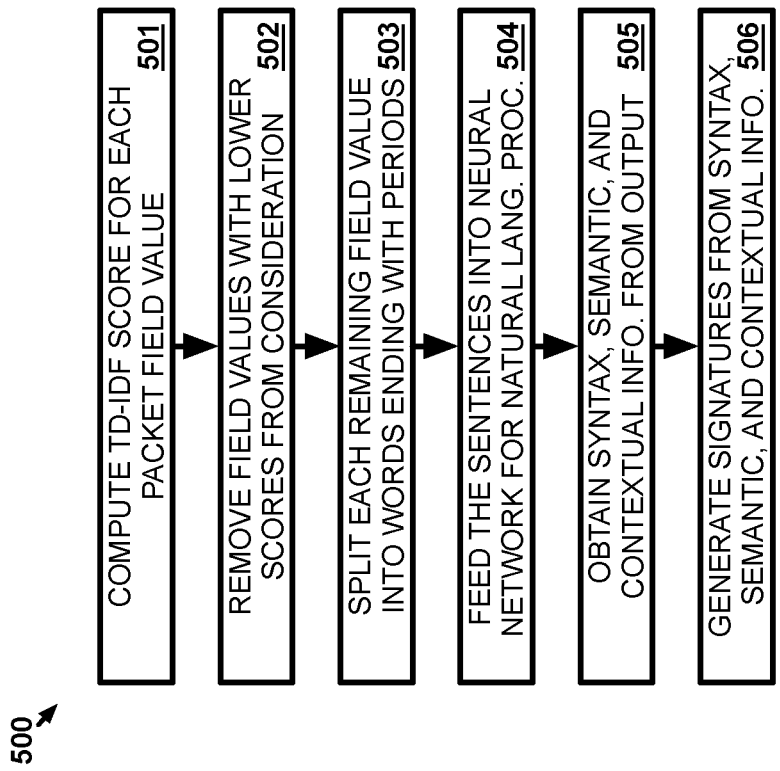
FIG. 5 illustrates another scenario for the other implementation to create signatures to identify network traffic associated with malware.

Once pcap files carrying malware communications have been identified to signature generation system 301, signature generation system 301 processes those files in accordance with scenario 500. FIG. 5 illustrates scenario 500 for implementation 300 to create signatures to identify network traffic associated with malware. Scenario 500 has signature generation system 301 compute a term frequency—inverse document frequency (TF-IDF) score for each packet field value in the headers of the malware communication carrying packets (501). A TF-IDF score is meant to numerically indicate how important a word is to a document and is often times used by search engines when ranking search results. The words in the case of this example are values, or value components, of the field values in the packets being processed. Essentially, TF-IDF scoring provides lower scores to terms that occur more frequently. For example, in the English language, the word "the" appears very frequently in almost all circumstances, therefore, "the" would be given a very low score since the word would not be of much value in differentiating one language composition from another. As such, signature generation system 301 removes field values with lower scores from consideration during natural language processing (502). For example, the score may be determined on a defined scale (e.g., 0-100) and scores below a pre-defined threshold score level are removed from consideration.

Once field values having low enough scores are removed from consideration, the remaining field values are divided into words that end in periods to conform with the punctuation of a typical sentence (503). Each field value in this example comprises a single sentence, although, other examples may include multiple field values per sentence. Some field values may only comprise a single word while other field values may include multiple words. As such, some sentences may include only single words. The sentences created from fields of a single packet may be combined into what may be considered a single document. Separating field values of a single packet into a respective document allows a means for the field values of each packet to be distinguishable by the natural language processing of the neural network.

The sentences created by signature generation system 301 are then fed as input into a neural network for natural language processing (504). As noted before, the natural language processing may be performed using a word2vec model but other natural language processing models may be used instead. Since the input into the neural network is sentences having "words," the natural language processing model of the neural network is able to process the sentences in the same manner it would process sentences written in language used by humans for communication (e.g., English, Spanish, etc.). The natural language processing does not give any difference to the meaning of individual words, therefore, using the field values as words does not affect the natural language processing. While the steps of scenario 500 may be performed in parallel for packets from all malware families identified to signature generation system 301, the natural language processing of the sentences is performed on a per-family basis. This allows the natural language processing to only consider field value information from packets of a single malware family at a time to provides results with respect that single malware family. In some examples, the sentences are fed into the neural network in the same sequence in which the packets from which the sentences were derived were received. This allows the natural language processing to properly consider the order of the sentences.

Signature generation system 301 obtains the results of the natural language processing, including syntax, semantic, and contextual information about the sentences input into the neural network for each malware family (505). This syntax, semantic, and contextual information is used by signature generation system 301 to generate one or more signatures to identify packets corresponding to packets of each malware family processed (506). The syntax, semantic, and contextual information about the sentences indicates attributes of the field value information in packets carrying the malware communications for each respective malware family of packets processed by signature generation system 301. For instance, a particular sentence (e.g., one representing a particular field value) may always be included in a document immediately following a document having another particular sentence. This corresponds to a packet having a particular field value always following a packet having another particular field value. One of the signatures generated by signature generation system 301 for the malware family in the above example would therefore indicate that firewall 302 and firewall 303 should stop packets with those field values received in that order. Advantageously, since the signature in the aforementioned example spans multiple packets, and in some cases, spans multiple network sessions, the signature might not have been recognized had the natural language processing not been used.

FIG. 6 illustrates HTTP (Hypertext Transfer Protocol) packet field values 600 used by implementation 300 to create signatures to identify network traffic associated with malware. HTTP packet field values 600 is used below as an example of how a single packet carrying communications for a particular malware family may be handled in scenario 500. While HTTP packet field values 600 are from an HTTP packet, it should be understood that malware may communicate using any other type of packet. HTTP packet field values 600 includes field values 611-618. After computing the TF-IDF scores for each of field values 611-618, signature generation system 301 determines that field value 617 and field value 618 have scores that fall below the threshold required by signature generation system 301 for inclusion in sentences for processing. The remaining field values 611-616 have scores that meet the threshold required for includes in the sentences and are boxed in to visually indicate that fact in FIG. 6. Signature generation system 301 can then proceed to generating sentences from field values 611-616.

FIG. 7 illustrates document 700 used by implementation 300 to create signatures to identify network traffic associated with malware. In particular, document 700 is an example of how sentences may be generated from field values 611-616. Field value 611 and field value 612 are turned into the first sentence of document 700 by signature generation system 301. In addition to the field values themselves, the sentence includes information as one or more words describing the field value. In this case, rather than simply using "GET" in the sentence, signature generation system 301 notes that GET is the method that is being used (i.e., that the packet is an HTTP GET request). Likewise, the Uniform Resource Locator (URL) of field value 612 is prefaced with "url" to indicate that a URL follows. The URL itself is separated into multiple words based on the characters therein, although other conventions for separating URLs into words may be used in other examples. The remaining field values are similarly separated into the subsequent sentences of document 700. It should be understood, that other examples may divide field values 611-616 into sentences using other conventions. The convention used may depend on the natural language processing model used by the neural network, as different models may react differently to various sentence structures for information obtained from field values 611-616.

Figure 8:
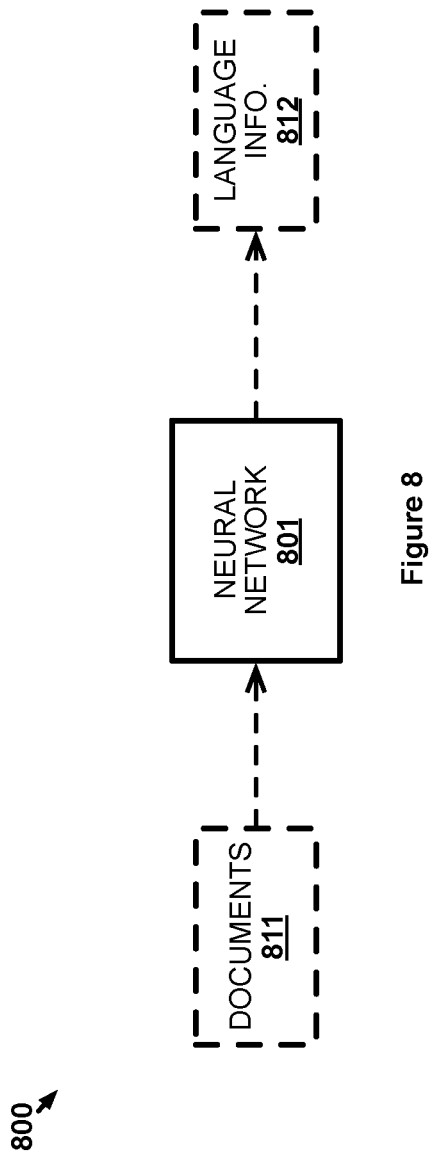
FIG. 8 illustrates yet another scenario for the other implementation to create signatures to identify network traffic associated with malware.

FIG. 8 illustrates scenario 800 for implementation 300 to create signatures to identify network traffic associated with malware. Scenario 800 includes neural network 801, which is used by signature generation system 301 to perform natural language processing on sentences fed into neural network 801 by signature generation system 301 in documents 811. In this example, neural network 801 is executing on signature generation system 301 although signature generation system 301 may feed sentences into neural network 801 executing on some other system accessible to signature generation system 301 via network 304, Internet 305, or some other network. Documents 811 each include sentences generated from a respective packet of the packets carrying malware communications for a particular malware family. For example, document 700 may be included within documents 811 if documents 811 correspond to the same malware family as document 700. Neural network 801 processes documents 811 to provide language information 812, which may include syntax, semantic, and contextual information about documents 811. Language information 812 would then be used by signature generation system 301 to generate signatures to identify subsequently received packets carrying malware communications for the malware family corresponding to documents 811.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for generating malware network traffic signatures, the method comprising:
generating, by a processor, a plurality of documents, wherein generating the plurality of documents comprises:
for each of a plurality of malware data packets in a first malware family, generating, by the processor, a document having a plurality of natural language sentence structures, wherein generating the document comprises, for each of a plurality of fields in the malware data packet, organizing information from the field into one or more of the plurality of natural language sentence structures;
inputting the generated documents corresponding to the plurality of malware data packets into a first neural network implementing natural language processing; and
generating one or more signatures for the first malware family from results of the natural language processing of the generated documents.

2. The method of claim 1, further comprising:
processing network traffic to identify one or more malware data packets from network traffic using the one or more signatures.

3. The method of claim 2, wherein processing the network traffic is performed in a network firewall, and the method further comprising:
distributing the one or more signatures to the network firewall.

4. The method of claim 1, wherein the natural language processing of the generated documents comprises:
identifying one or more of syntax information, semantic information, and contextual information about network communications made by malware in the first malware family for inclusion in the results of the natural language processing of the generated documents.

5. The method of claim 4, wherein generating the signatures comprises:
using one or more of the syntax information, semantic information, and contextual information to identify attributes shared among the network communications; and
creating the signatures based, at least in part, on the identified attributes.

6. The method of claim 1, wherein generating the plurality of documents comprises:
extracting the plurality of fields from headers of the plurality of malware data packets.

7. The method of claim 1, further comprising:
computing a term frequency-inverse document frequency (TF-IDF) score for each field value in the plurality of fields; and
wherein the information from the plurality of fields does not include one or more field values having respective scores that do not meet at least one criterion for inclusion in the information.

8. The method of claim 1, wherein generating the document comprises:
splitting field values of each respective data packet of the plurality of malware data packets into one or more words followed by a period to form the sentence structure for the respective data packet.

9. The method of claim 1, wherein the plurality of malware data packets are represented by one or more pcap files.

10. The method of claim 1, wherein the first neural network comprises a word2vec model.

11. An apparatus for generating malware network traffic signatures, the apparatus comprising:
one or more non-transitory computer readable storage media;
a processing system operatively coupled with the one or more non-transitory computer readable storage media; and
program instructions stored on the one or more non-transitory computer readable storage media that, when read and executed by the processing system, direct the processing system to:
generate a plurality of documents, wherein generating the plurality of documents comprises,
for each of a plurality of malware data packets in a first malware family, generate a document having a plurality of natural language sentence structures, where the program instructions to direct the processing system to generate the document comprise program instructions to, for each of a plurality of fields in the malware data packet, organize information from the field into one or more of the plurality of natural language sentence structures;
input the generated documents corresponding to the plurality of malware data packets into a first neural network implementing natural language processing; and
generate one or more signatures for the first malware family from results of the natural language processing of the generated documents.

12. The apparatus of claim 11, wherein network traffic is processed to identify one or more malware data packets from network traffic using the one or more signatures.

13. The apparatus of claim 12, wherein a network firewall processes the network traffic and the program instructions further direct the processing system to:
distribute the one or more signatures to the network firewall.

14. The apparatus of claim 11, wherein the natural language processing of the generated document comprises:
identifying one or more of syntax information, semantic information, and contextual information about network communications made by malware in the first malware family for inclusion in the results of the natural language processing of the generated documents.

15. The apparatus of claim 14, wherein to generate the signatures, the program instructions direct the processing system to:
use one or more of the syntax information, semantic information, and contextual information to identify attributes shared among the network communications; and
create the signatures that identify the attributes.

16. The apparatus of claim 11, wherein to generate the plurality of documents, the program instructions direct the processing system to:
extract the plurality fields from headers of the plurality of malware data packets.

17. The apparatus of claim 11, wherein the program instructions further direct the processing system to:
compute a term frequency-inverse document frequency (TF-IDF) score for each field value in the plurality of fields; and
wherein the information for the plurality of fields does not include one or more field values having respective scores that do not meet at least one criterion for inclusion in the information.

18. The apparatus of claim 11, wherein to generate the plurality of documents, the program instructions direct the processing system to:

split field values of each respective data packet of the plurality of malware data packets into one or more words followed by a period to form the sentence structure for the respective data packet.

19. The apparatus of claim 11, wherein the plurality of malware data packets are represented by one or more pcap files.

20. One or more computer readable storage media having program instructions stored thereon for generating malware network traffic signatures, the program instructions, when read and executed by a processing system, direct the processing system to:

generate a plurality of documents, wherein generating the plurality of documents comprises,
    for each of a plurality of malware data packets in a first malware family, generate a document having a plurality of natural language sentence structures, wherein the program instructions to direct the processing system to generate the document comprise program instructions to, for each of a plurality of fields in the plurality of malware data packets, organize information from the field into one or more of the plurality of natural language sentence structures;
input the generated documents corresponding to the plurality of malware data packets into a first neural network implementing natural language processing; and
generate one or more signatures for the first malware family from results of the natural language processing of the generated documents.

\* \* \* \* \*

UNITED STATES PATENT AND TRADEMARK OFFICE
CERTIFICATE OF CORRECTION

PATENT NO. : 10,785,236 B2
APPLICATION NO. : 15/885543
DATED : September 22, 2020
INVENTOR(S) : Zhaoyan Xu and Tongbo Luo It is certified that error appears in the above-identified patent and that said Letters Patent is hereby corrected as shown below:

Column 9, Lines 59 and 60, Claim 8, the portion reading "generating the document comprises:" should read "generating the plurality of documents comprises:"

Signed and Sealed this
First Day of December, 2020

Andrei Iancu
*Director of the United States Patent and Trademark Office*